US008515730B2

(12) United States Patent
Fux et al.

(10) Patent No.: US 8,515,730 B2
(45) Date of Patent: Aug. 20, 2013

(54) METHOD OF E-MAIL ADDRESS SEARCH AND E-MAIL ADDRESS TRANSLITERATION AND ASSOCIATED DEVICE

(75) Inventors: Vadim Fux, Waterloo (CA); Michael Elizarov, Waterloo (CA); Dan Rubanovich, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 1134 days.

(21) Appl. No.: 12/437,645

(22) Filed: May 8, 2009

(65) Prior Publication Data

US 2009/0299727 A1  Dec. 3, 2009

Related U.S. Application Data

(60) Provisional application No. 61/052,039, filed on May 9, 2008.

(51) Int. Cl.
*G06F 17/28* (2006.01)

(52) U.S. Cl.
USPC ............... 704/2; 704/3; 704/4; 704/5; 704/7; 704/8; 715/264

(58) Field of Classification Search
USPC ......................................... 704/2–8; 715/264
See application file for complete search history.

(56) References Cited

U.S. PATENT DOCUMENTS

| | | | |
|---|---|---|---|
| 6,460,015 B1 | 10/2002 | Hetherington et al. | |
| 6,996,520 B2 | 2/2006 | Levin | |
| 7,596,609 B1 * | 9/2009 | Refuah et al. | 709/218 |
| 2003/0200079 A1 * | 10/2003 | Sakai | 704/8 |
| 2004/0044791 A1 * | 3/2004 | Pouzzner | 709/245 |
| 2004/0194018 A1 * | 9/2004 | Abir | 715/501.1 |
| 2005/0119875 A1 * | 6/2005 | Shaefer et al. | 704/7 |
| 2005/0216253 A1 * | 9/2005 | Brockett | 704/5 |
| 2007/0011132 A1 * | 1/2007 | Zhou et al. | 707/1 |
| 2007/0092072 A1 * | 4/2007 | Jacobs | 379/142.06 |
| 2007/0280179 A1 | 12/2007 | Van Belle et al. | |
| 2007/0282957 A1 * | 12/2007 | Van Belle et al. | 709/206 |

(Continued)

FOREIGN PATENT DOCUMENTS

| | | |
|---|---|---|
| DE | 112009001107 T5 | 4/2011 |
| WO | 99/39280 | 8/1999 |
| WO | 02/37327 | 5/2002 |
| WO | 2009135316 A1 | 11/2009 |

OTHER PUBLICATIONS

Kassoff et al.: "Semantic Email Addressing: The Semantic Web Killer App?" IEEE Internet Computing; vol. 13, Issue 1; Jan.-Feb. 2009, ISSN: 1089-7801.

(Continued)

*Primary Examiner* — Lamont Spooner
(74) *Attorney, Agent, or Firm* — Finnegan, Henderson, Farabow, Garrett & Dunner, LLP

(57) ABSTRACT

An improved method of transliterating non-Latin input within an e-mail address field to the Latin equivalent. A routine in a handheld device is structured to detect a triggering event that indicates an e-mail address is being input into an e-mail address field. Following the triggering event, both prior and subsequent input is transliterated to Latin characters as these characters are required by Internet protocols. The transliteration routine may also be utilized to search an e-mail address book wherein names are recorded using both Latin and non-Latin characters.

16 Claims, 5 Drawing Sheets

(56) References Cited

U.S. PATENT DOCUMENTS

| | | | |
|---|---|---|---|
| 2007/0283044 A1* | 12/2007 | Van Belle et al. | 709/245 |
| 2008/0167856 A1* | 7/2008 | Janakiraman et al. | 704/9 |
| 2008/0168348 A1* | 7/2008 | Bergstrom et al. | 715/700 |
| 2009/0319257 A1* | 12/2009 | Blume et al. | 704/7 |
| 2010/0153396 A1* | 6/2010 | Margulies et al. | 707/737 |

OTHER PUBLICATIONS

Examination Report in Great Britain Application No. GB1020816.3, dated Aug. 3, 2011 (5 pages).

Examination Report in Great Britain Application No. GB1020816.3, dated May 19, 2011 (3 pages).

Examination Report in Great Britain Application No. GB1020816.3, dated Oct. 17, 2011 (2 pages).

International Search Report and Written Opinion, for International Application No. PCT/CA2009/000638, dated Aug. 17, 2009 (13 pages).

Preliminary Report on Patentability in International Application No. PCT/CA2009/000638, dated Nov. 18, 2010 (8 pages).

German Office Action in corresponding German Patent Application No. 11 2009 001 107.1-53, dated Feb. 10, 2012.

Canadian Office Action in corresponding Canadian Patent Application No. 2,723,898, dated Jul. 3, 2012.

* cited by examiner

METHOD OF E-MAIL ADDRESS SEARCH AND E-MAIL ADDRESS TRANSLITERATION AND ASSOCIATED DEVICE

CROSS REFERENCE TO RELATED APPLICATION

This application claims priority under 35 U.S.C. §119(e) to U.S. Provisional Patent Application Ser. No. 61/052,039, filed May 9, 2008 entitled, Method of E-Mail Address Transliteration and Associated Device.

BACKGROUND

1. Field

The disclosed and claimed concept relates generally to handheld electronic devices and, more particularly, to a handheld electronic having a routine structured to transliterate non-Latin input within an e-mail search or an e-mail address field to the Latin equivalent.

2. Description of the Related Art

Numerous types of handheld electronic devices are known. Examples of such handheld electronic devices include, for instance, personal data assistants (PDAs), handheld electronic devices, two-way pagers, cellular telephones, and the like. Many handheld electronic devices also feature wireless communication capability, although many such handheld electronic devices are stand-alone devices that are functional without communication with other devices.

BRIEF DESCRIPTION OF THE DRAWINGS

A full understanding of the disclosed and claimed concept can be obtained from the following Description when read in conjunction with the accompanying drawings in which:

Figures 5A, 5B, 5C, 5D:
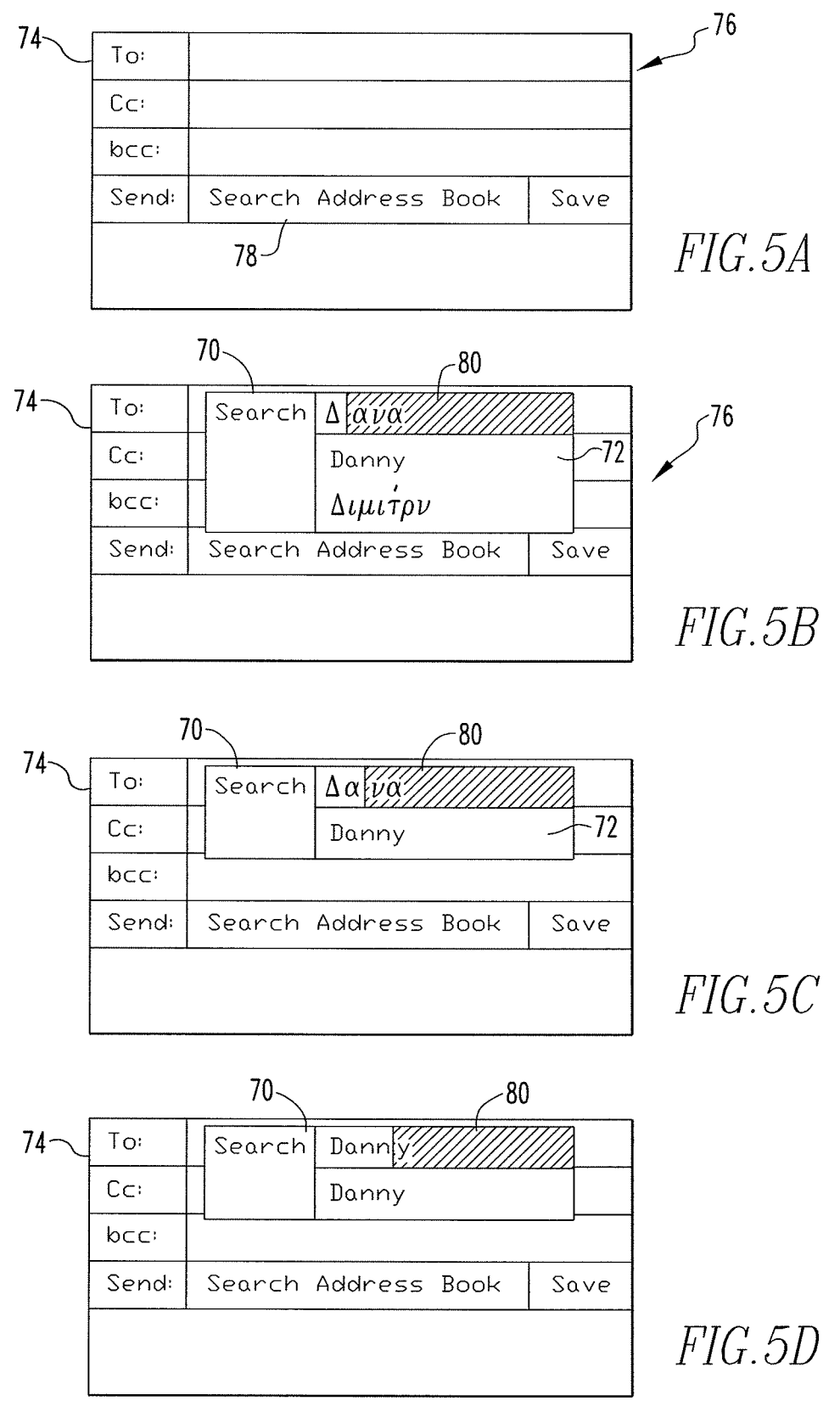

FIGS. 5A-5D show the displayed output of an e-mail address book search field in the situations described below.

Similar numerals refer to similar parts throughout the specification.

DESCRIPTION

As used herein a "routine" is a set of instructions or a program, or a plurality of cooperative programs, structured to operate on one or more handheld electronic devices.

As used herein, the expression "a number of" and variations thereof shall refer broadly to a nonzero quantity, including a quantity of one.

As used herein, "present" and variations thereof, relate to an electronic construct created by a routine being executed in a processor apparatus and transmitted as a signal to a display which converts the signal into a viewable image. Thus, it is understood that when a routine "presents" any image, the routine is "presenting" the image via the processor apparatus and display.

As used herein, the word "click" when used as a verb means the act of using an input device associated with a handheld electronic device, such as, but not limited to, a mouse or a trackball, to actuate a program or other function. The input device is structured to move a cursor and to accept an input indicating a selection. Such an input is, typically, provided by a button on the input device (mouse or trackball), tapping the input device (touch screen), or depressing the input device (trackball). "Clicking" is a series of actions including placing a pointer presented on the display over an icon, field or other location and then using the input device to select the icon or place a cursor in the selected location. Similarly, a user may "double-click." The result of a click vs. a double click varies according to how the handheld electronic device is programmed. For example, a common scheme is to have a single click select an icon and a double click start a program associated with an icon. Further, a single click may position the cursor within a field so that another input device, typically a keyboard, may be used to provide additional input.

Figure 1:
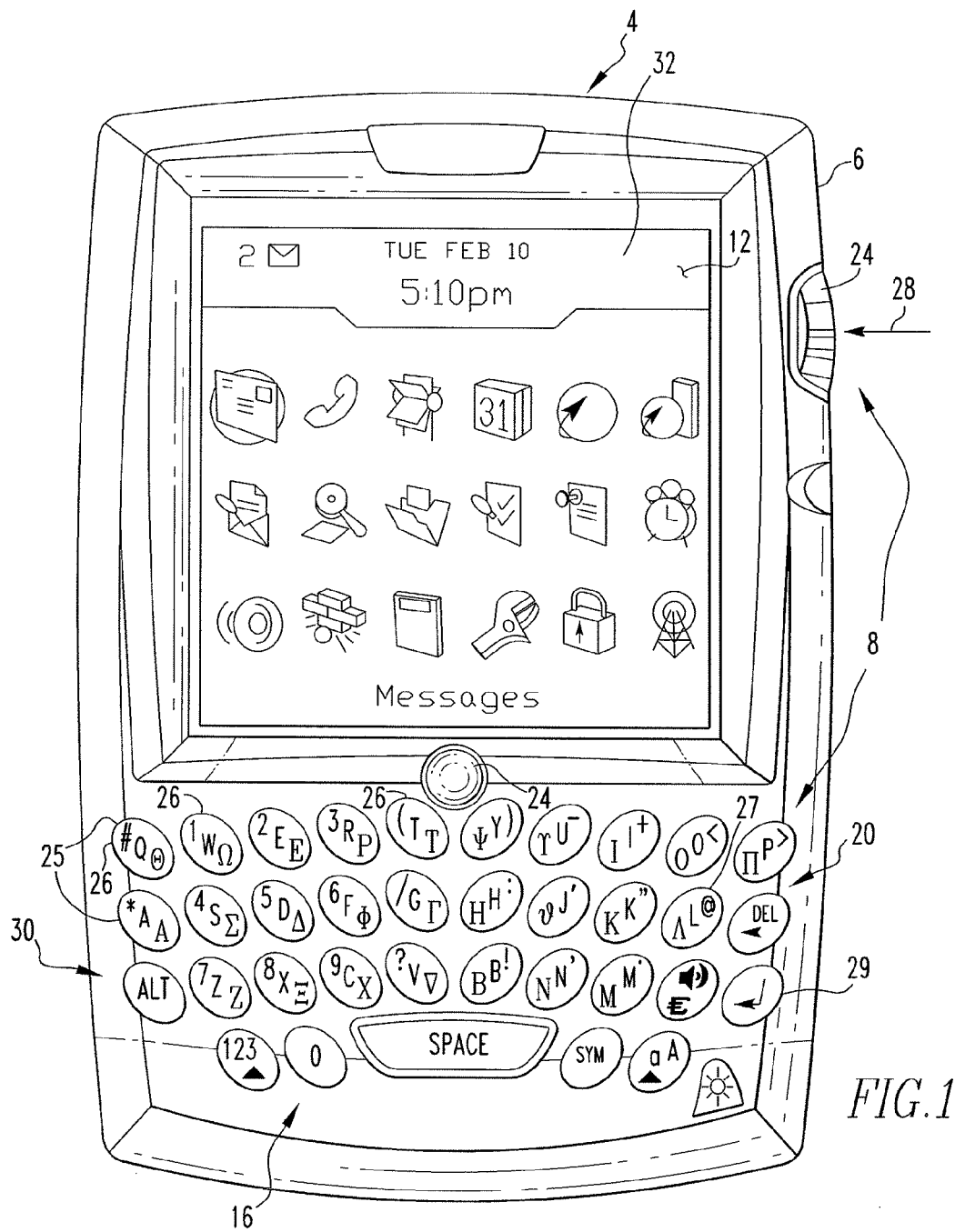
FIG. 1 is a front elevational view of an exemplary handheld electronic device in accordance with the disclosed and claimed concept upon which is performed an improved method in accordance with the disclosed and claimed concept.
Figure 2:
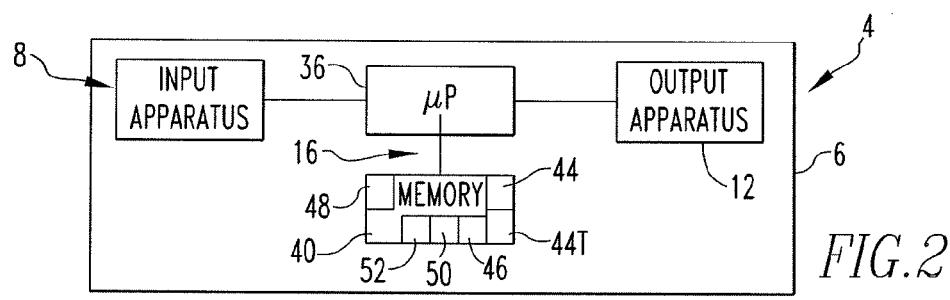
FIG. 2 is a schematic depiction of the handheld electronic device of FIG. 1.

An improved handheld electronic device 4 in accordance with the disclosed and claimed concept is indicated generally in FIG. 1 and is depicted schematically in FIG. 2. The improved handheld electronic device 4 comprises a housing 6 upon which are disposed an input apparatus 8, an output apparatus 12, and a processor apparatus 16. The input apparatus 8 provides input to the processor apparatus 16. The processor apparatus 16 provides output signals to the output apparatus 12.

The input apparatus 8 comprises a keyboard 20 and a track wheel 24. The keyboard 20 in the exemplary embodiment depicted herein comprises a plurality of keys 26 that are each actuatable to provide input to the processor apparatus 16. The track wheel 24 is rotatable to provide navigational and other input to the processor apparatus 16, and additionally is translatable in the direction of the arrow 28 of FIG. 1 to provide other input, such as selection inputs. The keys 26 and the track wheel 24 serve as input members which are actuatable to provide input to the processor apparatus 16. The exemplary output apparatus 12 comprises a display 32.

It is further noted that the plurality of keys 26 may include character keys 25, which are characters and numbers, functional character keys 27, such as, but not limited to the "@" symbol, and operational keys 29, such as, but not limited to the "enter" or "return" key. As detailed below, the character keys 25 may be associated with one or more character sets, i.e. alphabets or a punctuation character set. Thus, one key 26 may be a character key 25 and a functional character key 27, as well as an operational key 29. However, to reduce confusion as to purpose of a key 26, operational keys 29 are typically not mixed with character keys 25 and functional character keys 27. Accordingly, each key 26 may include a number of indicia 30 thereon representing the character(s) and operations associated with that key 26.

Examples of other input devices not expressly depicted herein would include, for instance, a mouse or trackball for providing navigational inputs, such as could be reflected by movement of a cursor on the display 32, and other inputs such as selection inputs. Still other exemplary input devices would include a touch-sensitive display, a stylus pen for making menu input selections on a touch-sensitive display displaying menu options and/or soft buttons of a graphical user interface (GUI), hard buttons disposed on a case of the handheld electronic device 4, and so on. Examples of other output devices would include a touch-sensitive display, an audio speaker, and so on.

An exemplary mouse or trackball would likely advantageously be of a type that provides various types of navigational inputs. For instance, a mouse or trackball could provide navigational inputs in both vertical and horizontal directions with respect to the display 32, which can facilitate input by the user. Further a trackball may be moved inwardly relative to the housing 6 to provide an input actuation, that is, a "click."

The processor apparatus 16 comprises a processor 36 and a memory 40. The processor 36 may be, for example and without limitation, a microprocessor (μP) that interfaces with the memory 40. The memory 40 can be any one or more of a variety of types of internal and/or external storage media such as, without limitation, RAM, ROM, EPROM(s), EEPROM(s), FLASH, and the like that provide a storage register for data storage such as in the fashion of an internal storage area of a handheld electronic device, and can be volatile memory or nonvolatile memory. The memory 40 has stored therein a number of routines 44 that are executable on the processor 36. The processor apparatus 16 is further structured to receive input from the keyboard 20 and to provide output signals to the display 32.

The routines 44 include at least one keyboard routine 46 structured to associate an individual character key 25, and its input, with a specific character. The characters are provided in a database 48 having sets of associated characters. The sets of associated characters include at least one non-Latin character set and the Latin character set. It is noted that many character sets, including the Latin and the Greek character sets, automatically include character sub-sets of capital and lower case characters. The sets of associated characters, preferably, include a set of punctuation characters as well. As an example, the following discussion will use the Greek alphabet as the non-Latin character set. However, it is understood that the method claimed below is not limited to use of the Greek alphabet as the non-Latin character set.

The at least one keyboard routine 46 is structured to associate a specific character, e.g. "Ω," with a specific key 26. Thus, when a user actuates the key associated with the character "Ω," the processor apparatus 16 will interpret the input from that key 26 as being associated with the character "Ω" and may, for example, present an output on the display 32 of the character "Ω." The at least one keyboard routine 46 is further structured to redefine the character set associated with the keys 26. For example, if the Latin character set is active, the at least one keyboard routine 46 is, typically, structured to associate the Latin lower case character sub-set with the keys 26. However, when a user actuates a specific key 26, e.g. the "CAP" operational key 29, the at least one keyboard routine 46 is structured to redefine the character sub-set associated with the character keys 25 to be the Latin capital character set. Similarly, if the keys 26 were associated with one character set, e.g. the Latin character set, the at least one keyboard routine 46 may redefine the keys 26 to be associated with another character set, e.g. the Greek character set. Further, the use of an operational key 29, e.g. the "ALT" key causes the at least one keyboard routine 46 to associate the punctuation character set and/or a number character set with the keys 26.

It is further noted that character sets include equivalent characters as indicated by an indicia 30 on the keys 26 For example, in use the Latin character "A" is phonetically identical to the Greek "Alpha." Thus, the "A" character key 25 includes an indicia 30 for both the Latin "A" and the Greek "Alpha." Certain Greek letters may not have equivalents in the Latin character set, for example, the theta, "θ," is pronounced as "th." In Latin, "th" is a digraph of the characters "t" and "h." As the character theta, "θ," cannot be split between the "t" and "h" character keys 25, the theta, "θ," is disposed on the "Q" character key 25 for which there is no Greek equivalent. The transliteration routine 44T (discussed below) is structured to redefine digraphs with the equivalent Latin character combinations. For those Greek characters for which there are commonly accepted equivalents in Latin characters, the two equivalent character indicia 30 are disposed on the same key and the transliteration routine 44T will replace any Greek character with the Latin equivalent. The keys 26 may further have an indicia 30 of a punctuation mark or a number disposed thereon.

The routines 44 also include at least one e-mail routine 50 structured to present an e-mail address field 52, to detect and present input from the keyboard character keys 25 and the functional character keys 27, and to transmit an e-mail message over the Internet or a network using similar protocols. The e-mail address field 52 is typically identified by the word "To" followed by a text field in which the user my input the recipient's address. As used herein, optional e-mail address fields 52 such as the carbon copy, or "cc," field and the blind carbon copy, or "bcc," field are considered to be equivalent with the primary e-mail address field 52. It is further noted that an e-mail address 60 has two parts, the user name 62 (also referred to as the "mailbox name") and the host (or domain) name 64. These two parts are part of a hierarchy of names; that is, the domain name 64 is of a higher level than the user name 62. The user name 62 may be described as the lowest-level name in the hierarchy. Typically, the user name 62 and the domain name 64 are separated by the ampersand or the commercial at symbol, "@," 66. It is noted that the "functional character keys 27" are not identified herein as "punctuation keys" because selected punctuation marks act as operators, or functional, marks in certain instances. One of those instances is the use of the "@" 66 symbol in an e-mail address. That is, the "@" 66 symbol in an e-mail address functions to separate the user name 62 and the domain name 64. It is further noted that the e-mail protocol used by the Internet requires that all addresses utilize the Latin character set.

As is known, for a user to send a message, the user must provide the recipient's e-mail address 60 in the e-mail address field 52. It is also known for handheld electronic devices 4 to include an address book, which is a database, within, or associated with, an e-mail routine 50. The address book is used to record a number of e-mail addresses 60 and the e-mail routine 50 allows a user to look up, that is, present a list of, recorded e-mail addresses. When the list of e-mail addresses 60 is presented, the e-mail routine 50 allows a user to insert the e-mail addresses 60 in the e-mail address field 52 by clicking, or double-clicking, on one or more e-mail addresses 60 that are presented. The at least one e-mail routine 50 is, preferably, structured to record and present actual names as well as e-mail addresses 60. That is, the at least one e-mail routine 50 is structured to record e-mail addresses 60 and associate a name, nickname or description therewith. Thus, if Bill Smith has an e-mail address "Bill_Smith123@thisdomainnameistoolong.com," the user may simply enter the name "Bill Smith" and the at least one e-mail routine 50 provides the associated e-mail address to the e-mail address field 52. Thus, as used herein, a name/e-mail address are equivalent. That is, when a user provides, or searches for, a "name," the user may provide, or search for, either a given name or an e-mail address and, so long as either that name/e-mail address is in the address book, the output will be the same. The at least one e-mail routine 50 may be structured to present the name, the e-mail address, or both, in the e-mail address field 52, however, when the e-mail message is transmitted to the Internet, or any similar electronic network, the e-mail address 60, rather than the name, is provided per the relevant protocols.

Further, the at least one e-mail routine 50, preferably, includes an "auto-completion" feature. The auto-completion feature allows the user to enter a partial name, or e-mail address 60, into the e-mail address field 52 which then causes the address book to present one or more names, or e-mail addresses, that correspond with the partial name, or e-mail address. For example, suppose a user's address book included the names, "Bill Smith" and "Bill Turner." When the user inputs the character "B" in the e-mail address field 52, the auto-completion may enter the name Bill Smith, typically with the characters "ill Smith" highlighted. If the user wishes to enter the name "Bill Smith," the user simply actuates the "ENTER" key, the "TAB" key, or another non-character key having a similar function. However, if the user is sending a message to "Bill Turner," the user enters additional characters, e.g., "i," "l," and "l," to spell "Bill." At this point, "Bill Smith" is still the suggested name as "Smith" precedes "Turner" alphabetically. However, once the user enters the character "T," the auto-completion feature presents "Bill Turner" as the suggested input that may be selected by actuating the "ENTER" key or another non-character key having a similar function. Alternately, the auto-completion feature may present a pop-up box showing all address book entries that match the provided input and, as more characters are input, the number of address book entries that match the provided input will be reduced until the desired name, or e-mail address 60, is the only address book entry presented.

Finally, with respect to the auto-completion feature, it is noted that the auto-completion feature may be structured to input selected functional characters by inputting the functional characters in response to actuating the "SPACE" key 26. That is, a "space" is an invalid character within an e-mail address 60. Thus, when in the e-mail address field 52, the "SPACE" key 26 may be redefined to provide an alternate output. Given that e-mail addresses 60 must have an "@" 66 symbol and ".", as in ".com", a common scheme is to initially and temporarily associate the "SPACE" key 26 with the "@" 66 symbol and then to temporarily associate the "SPACE" key 26 with the ".". This relieves the user of having to actuate the "ALT" key which redefines the character keys 25 with the punctuation character set. Thus, while in the e-mail address field 52, a user may enter the address "ABC@XYZ.com" by pressing the following sequence of keys 26: "A", "B", "C", "SPACE", "X", "Y", "Z", "SPACE", "c", "o", and "m".

The at least one e-mail routine 50 is further structured to present an output table 54 adjacent to the e-mail address field 52. Preferably, the output table 54 includes a first field 56 and a second field 58. The purpose of these fields 56, 58 are discussed in detail below.

Typically, the user will identify the default character set to be associated with the keys 26. For the example herein, the default character set will be the Greek character set. Thus, when the user inputs text, the output on the display 42 will be presented in Greek characters. However, as noted above, the e-mail protocol used by the Internet requires that all e-mail addresses 60 utilize the Latin character set. Thus, entry of Greek characters is not suitable for an e-mail address 60. Accordingly, the method set forth below provides for the transliteration of the Greek character set into the Latin equivalent of that non-Latin character set. The transliteration method may be executed as an independent transliteration routine 44T, or, preferably, is incorporated into the at least one e-mail routine 50.

While one solution is to only allow Latin characters to be input to the e-mail address field 52, this is inconvenient to the user who prefers a non-Latin language. Thus, the method delays the transliteration of the non-Latin character set to the Latin character set as long as possible. That is, generally, the user is permitted to enter characters in the non-Latin character set until a trigger event occurs which causes the at least one e-mail routine 50 to shift input, and any associated output on the display 42, into the Latin character set. Further, once the at least one e-mail routine 50 begins to use the Latin character set, any non-Latin character input into the e-mail address field 52 is also converted to the Latin equivalent of that non-Latin character. It is noted that while the transliteration method herein is described in relation to Latin and Greek characters, the method can also be implemented for other languages.

Figure 3:
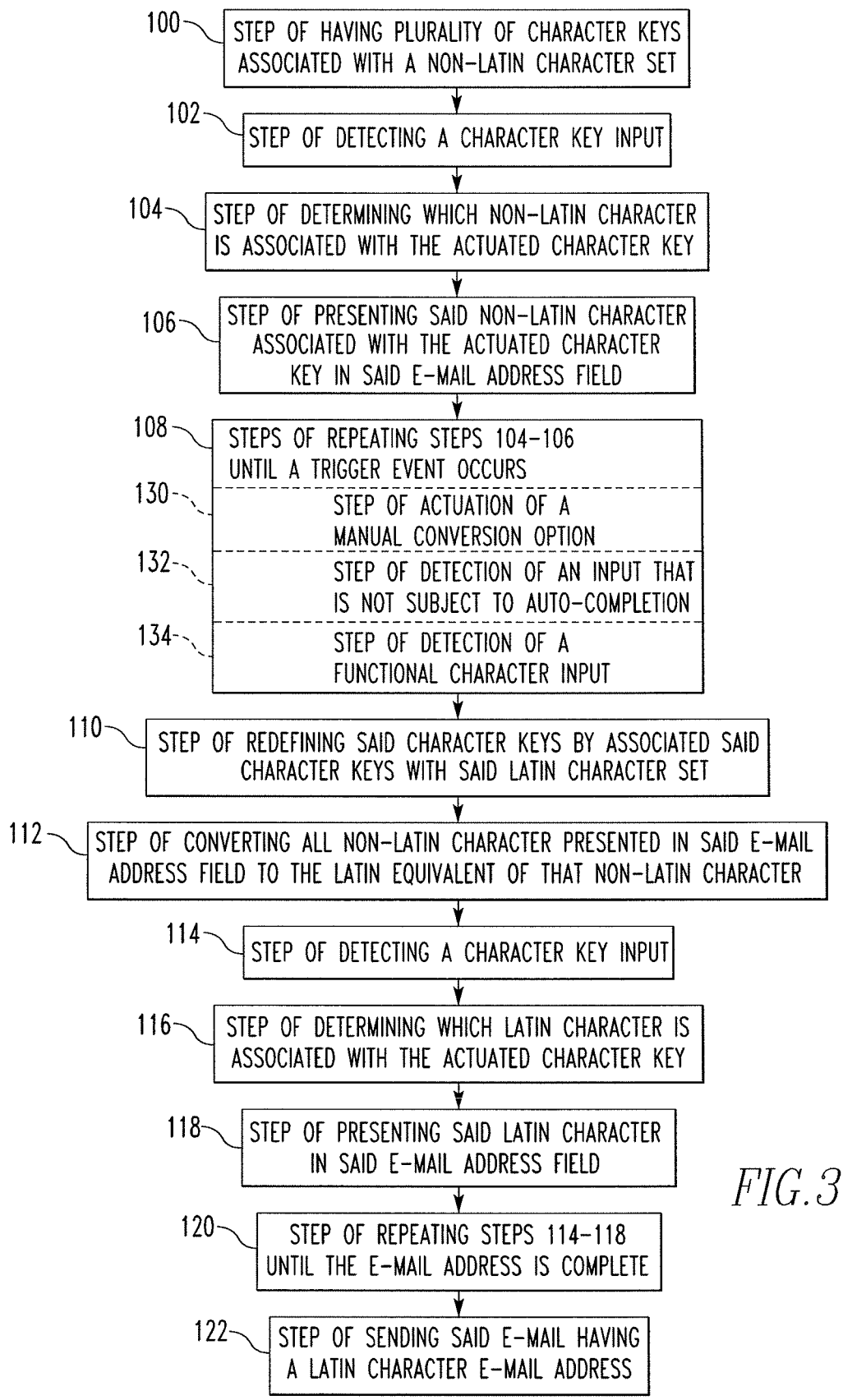
FIG. 3 is flowchart of the disclosed method.

Thus, as shown in FIG. 3, the method includes the following steps. Having 100 the plurality of character keys associated with a non-Latin character set, typically, the default language, detecting 102 a character key input, determining 104 which non-Latin character is associated with the actuated character key, presenting 106 the non-Latin character associated with the actuated character key in the e-mail address field, repeating 108 steps (104)-(106) until a trigger event occurs and then, redefining 110 the character keys by associating the character keys 25 with the Latin character set, converting 112 all non-Latin character presented in the e-mail address field to the Latin equivalent of that non-Latin character, detecting 114 a character key input, determining 116 which Latin character is associated with the actuated character key, presenting 118 the Latin character in the e-mail address field 52, repeating 120 steps (114)-(118) until the e-mail address is complete, sending 122 the e-mail having a Latin character e-mail address. It is noted that once the trigger event occurs, the e-mail routine 50 removes from the presentation in the output table 54 the non-Latin options. That is, as described below, the user may be entering Greek characters which are presented in the output table 54 as Greek characters. However, once the trigger event occurs, the e-mail routine 50 removes the Greek characters and presents the Latin equivalents. Any farther input of characters will be presented in the Latin character set.

Figure 4A:
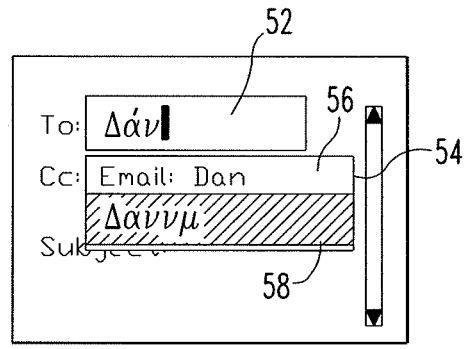
FIGS. 4A-4C show the displayed output of an e-mail address field in the situations described below.

There are three preferred trigger events selected from the group comprising: actuation 130 of a manual conversion option, detection 132 of an input that is not subject to auto-completion, or detection 134 of a functional character input. That is, the at least one e-mail routine 50 includes a manual selection of the Latin character set. The manual selection is useful when the user knows the address is not in the address book and may even be reading Latin characters to be input; for example when a user is reading an e-mail address from a printed page. As shown in FIG. 4A, the manual selection option may be presented in one of the fields 56, 58 of output table 54. That is, when the user positions the cursor in the e-mail address field 52, the output table 54 is displayed. In the first field 56 of the output table 54 may be the word "E-mail" or an equivalent indicator. If the user selects this option, e.g. by clicking on the word "E-mail," the selection acts as a trigger and the at least one e-mail routine 50 performs the steps of redefining 110 the character keys by associating the character keys with the Latin character set, then converting 112 all non-Latin character presented in the e-mail address field to the Latin equivalent of that non-Latin character, as well as the subsequent steps identified above.

Preferably, the address book is structured to present names, and not the associated e-mail address, in the default language. Thus, a user can type and read e-mail addresses, including those provided by the auto-completion feature, in the preferred language. However, when a user is entering an e-mail address that is not part of the address book, the input must be in the Latin character set. Thus, when the at least one e-mail routine 50 detects 132 of an input in the e-mail address field 52 that is not subject to auto-completion, the input must be converted to Latin characters. Thus, upon detection 132 of an input that is not subject to auto-completion the at least one e-mail routine 50 performs the steps of redefining 110 the character keys by associating the character keys with the Latin character set, then converting 112 all non-Latin character presented in the e-mail address field to the Latin equivalent of that non-Latin character, as well as the subsequent steps identified above. That is, detection 132 of an input that is not subject to auto-completion acts as a triggering event.

The third triggering event is the detection 134 of a functional character input. That is, when a user is entering an e-mail address 60 that is not part of the address book, the user will have to enter the "@" symbol as well as a "." as in ".com". As an address book entry should only include proper names and not include symbols, the entry of a functional character input indicates that the data being entered is not an address book name, but rather an actual e-mail address that needs to be in Latin characters. Accordingly, upon detection 134 of a functional character input, the at least one e-mail routine 50 performs the steps of redefining 110 the character keys by associating the character keys with the Latin character set, then converting 112 all non-Latin character presented in the e-mail address field to the Latin equivalent of that non-Latin character, as well as the subsequent steps identified above.

It is further noted that the fields 56, 58 of output table 54 may present two different out put options. That is, as shown in FIG. 4A, the first field 56 may be used to present the Latin characters equivalent to the non-Latin input, while the second field 58 may be used to present the auto-completion feature in the default character set. This allows a user to "pull," the manual conversion trigger, that is, actuate 130 the manual conversion option, at any time.

Figure 4B:
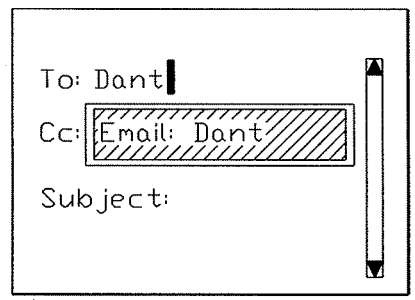
Figure 4C:
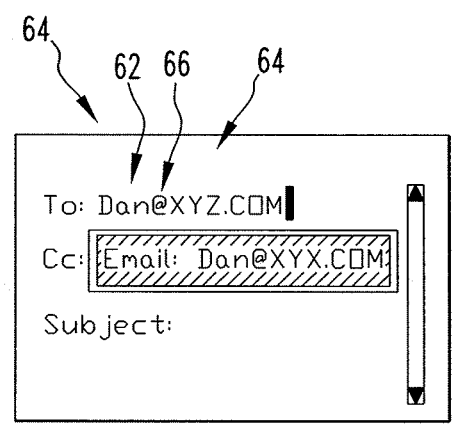

The output corresponding to the method is shown in FIGS. 4A-4C. For this example, it is assumed that the user has Greek as the default language and an English friend named "Danny," that is, "Δάννυ" in his address book. In FIG. 4A, the user has input two Greek characters, "Δ", "ά", and "ν" which have the Latin equivalent characters of "D", "a" and "n". Thus, after the user has typed "Δ", "ά", and "ν", the fields 56, 58 of output table 54 present the Latin equivalent "Dan" in the first field 56 and the address book auto-completion suggestion "Δάννυ" in the second field 58. At this point, the user may select the auto-completion suggestion "Δάννυ" or actuate any one of the three triggers identified above. For example, as shown in FIG. 4B, when the user is writing to a person named "Dante," the fourth character the user enters the lower case Greek "t" which is the Greek character "τ". As this is not the next character in "Δάννυ's" name, the auto-completion feature detects 134 that the input is not subject to auto-completion, therefore, a trigger event has occurred and the transliteration process as described above is put into effect.

Alternatively, as shown in FIG. 4C, the user may select, i.e. click on, the Latin equivalent "Dan" in the first field 56. This acts as an actuation 130 of the manual conversion option and, as a trigger event has occurred, the transliteration process as described above is put into effect and all subsequent character inputs will be in Latin. As noted above, as soon as the e-mail address field 52 is presented, e.g. when the user creates a new e-mail, and even before any text is entered in the e-mail address field 52, the output table 54 may be presented and include the first field 56 with a manual selection option. As shown in FIG. 4A, the manual selection option is presented as the word "E-mail," which indicates that by selecting this option, the output will be in the accepted e-mail character set, i.e. Latin.

As another alternative, and as shown in FIG. 4C, the user may also trigger transliteration by inputting a functional character, which is typically, but not limited to, the "@" 66 symbol. That is, as shown in FIG. 4C, the user has input the characters "Δ", "ά", and "ν", followed by the "@" 66 symbol. In this instance, the e-mail routine 50 recognizes the "@" 66 symbol as a functional character which identifies the input as an e-mail address as opposed to an address book entry. Thus, the e-mail routine 50 detects 134 a functional character input and, as a trigger event has occurred, the transliteration process as described above is put into effect. It is noted that the detection 134 of a functional character input as a triggering event works well with an e-mail routine 50 that redefines a SPACE key entry as an "@" 66 symbol and does not include an address book and an auto-completion feature. That is, returning to the prior example of an address book including the names "Bill Smith" and "Bill Turner," the entry of the character key 25 sequence "B", "I", "L", "L", "SPACE" will result in the e-mail routine 50 waiting for the next character key 25 entry to determine if the user is attempting to input the last name "Smith" or "Turner." In this instance, the SPACE key does not result in the entry of an "@" 66 symbol. However, and now returning to the second example using the Greek entry of "Δ", "ά", and "ν" where the e-mail routine 50 redefines a SPACE key entry as an "@" 66 symbol and does not include an address book and/or an auto-completion feature, the entry of the character key 25 sequence "Δ", "ά", and "ν", "SPACE", results in the input of the "@" 66 symbol once the SPACE key is actuated. This, in turn, acts as a triggering event and the transliteration process as described above is put into effect. Therefore, the user may further complete the e-mail address with the domain, "XYZ.com", as shown.

As set forth above, an address book is typically structured to record a plurality of e-mail addresses. In the preferred embodiment, the address book routine is part of the e-mail routine 50. It is, however, understood that the address book routine may be a separate routine structured to cooperate with the e-mail routine 50. While a user may manually type an e-mail address into an address book, it is more typical for a user to automatically "add" a "sender's," i.e. the person who sends a message, name and e-mail address to an address book. This is accomplished by actuating an "add sender to address book" button or menu option while an e-mail message is open, or otherwise highlighted. When such an action is initiated, the e-mail routine 50 copies the Latin e-mail address from the open, or otherwise highlighted, e-mail into the address book. The e-mail routine 50 may then prompt the user to provide a name that will be associated with the e-mail address. That is, an e-mail address may be "Bill_Smith@XYZ.com." After this name has been added to the address book, the user may associate the name "Bill Smith" with the e-mail address. As a further example, a user/sender's e-mail address may not incorporate expected characters and the associated name may be easier for the user to remember. That is, in a large e-mail system, common names like "Bill Smith" may belong to more than one user. As each "Bill Smith" must have a unique e-mail address, only the first may actually use the address Bill_Smith@XYZ.com. A subsequent "Bill Smith" may choose, or be assigned, a different e-mail address, such as "user1234@XYZ.com." In such a situation, a recipient of an e-mail message from the subsequent "Bill Smith" may not always remember that the "Bill Smith" which the recipient knows has random e-mail address. In this situation, the user/recipient may provide the name "Bill_Smith" as the name that will be associated with the e-mail address "user1234@XYZ.com" in the address book. Thus, at a later time, the user need only type in the known name, "Bill Smith," and the address book will provide the correct e-mail address, i.e. "user1234@XYZ.com."

The transliteration routine 44T may also be used to search for different name within the address book. That is, a multilingual user will typically receive e-mail from various users in different languages. Over time, the multilingual user's address book will include "names" in both Latin and non-Latin languages. As noted above, all e-mail addresses associated with the "names" are in Latin characters. When such a user desires to search for a name in the address book, the user would not wish to perform the search in multiple languages. Thus, the transliteration routine 44T may be used to assist when performing an address book search.

That is, the e-mail routine, or the address book routine, typically includes a search function. As shown in FIGS. 5A-5D, the search function is initiated by actuating a selectable search option, typically selected by actuating "search" button 78 or menu option while the address book is open. When the search function is initiated, a search field 70 is presented and results are presented within the search field and/or a results list 72. The user provides input into the search field via the plurality of keys 26. The input will typically be in the default language that the user has selected. It is noted that the auto-completion feature, described above, also utilizes the e-mail routine 50 search function. That is, while the auto-completion feature does not present a separate search field 70, the functionality described below is also applicable to the auto-completion feature displayed in an e-mail message's "To:" field 74. It is further understood that an e-mail message's "cc:" field or "bcc:" field have the same functionality as the primary "To:" field 74. Accordingly, as a specific search field and a "To:" field 74 may have the same functionality, hereinafter the phrase "e-mail address book search field" 76 shall apply to both.

Figure 6:
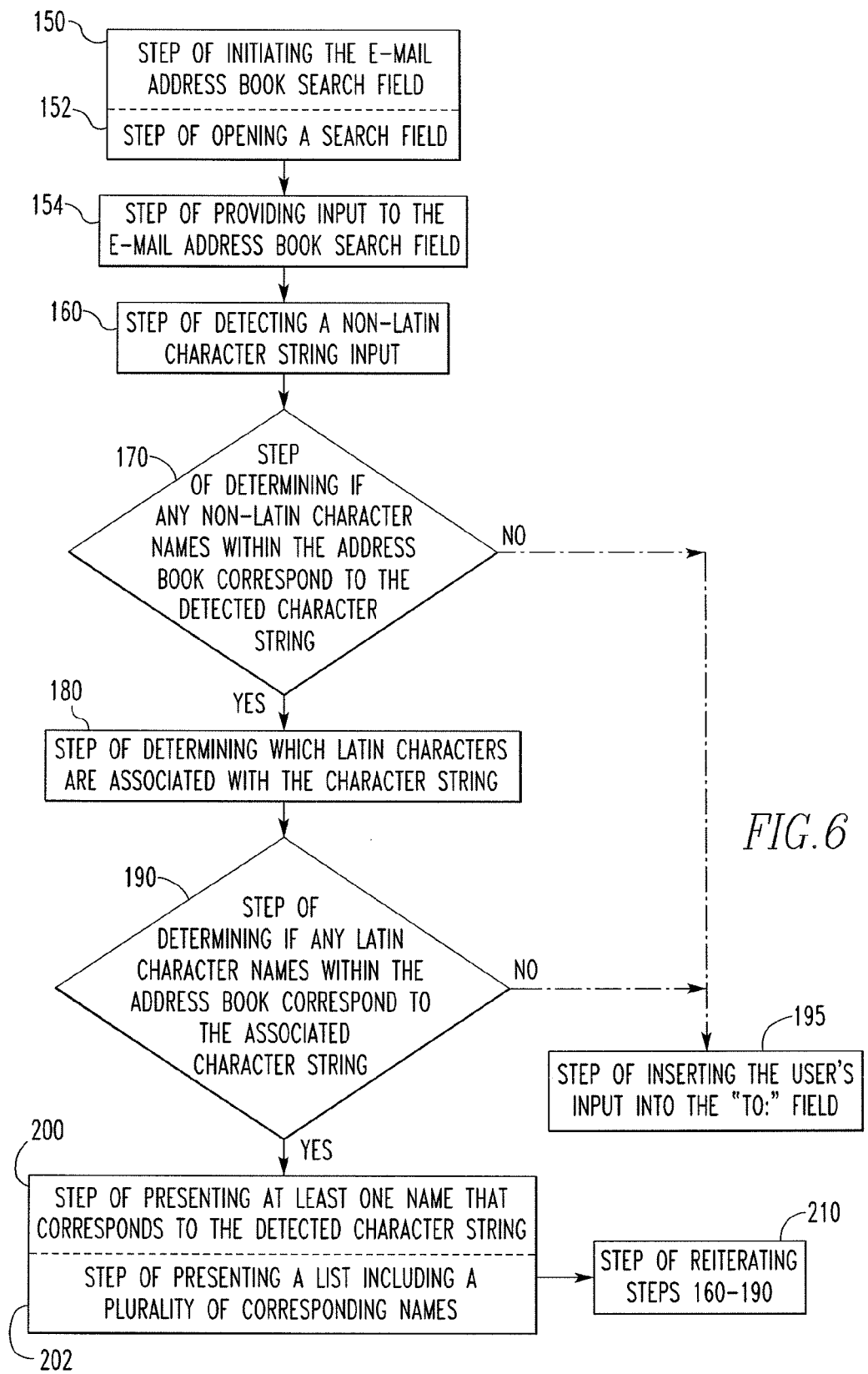
FIG. 6 is a further flowchart of the disclosed method.

As set forth above, this concept is primarily used when the default language does not use Latin characters. Accordingly, the example set forth below assumes that the default language uses non-Latin characters. A flowchart of the method is shown in FIG. 6.

The user initiates at Step 150 the e-mail address book search field by either opening at Step 152 a search field or by providing at Step 154 input within the "To:" field of an e-mail message. That is, the user provides at Step 154 input to the e-mail address book search field. As noted above, it is assumed that the primary input language on the user's device is a non-Latin language. The input is a character string that grows with each iteration, as discussed below, and the character string shall generally be discussed as if it includes a plurality of characters; it is, however, understood that the initial character string is a single character associated with a character key input. Thus, the e-mail routine 50 detects at Step 160 a non-Latin character string input having at least a non-Latin character. The e-mail routine then determines at Step 170 if any names (or e-mail addresses) comprising non-Latin characters within the address book correspond to the detected character string.

Generally, the determination of a corresponding name, in both Latin and non-Latin character sets, is based on comparing the character string in the e-mail address book search field 76 to the names, i.e. the character strings that comprise the names or e-mail addresses, within the address book. Each name that includes the character string input into the e-mail address book search field "corresponds" to that character string. Typically, the character sting is identical to the name in the e-mail address book, i.e. the first respective characters are the same, the second respective characters are the same, etc. There are, however, instances where the character sting is disposed at another location within the name. For example, a person's given name may be "H. Jon Benjamin" and this may be the name within the e-mail address book. If the person is known as "Jon Benjamin," this would be the likely input into the e-mail address book search field 76. As the character string "Jon Benjamin" is located within the name H. Jon Benjamin, the name corresponds to the character string. Thus, if a user input "J," "o", "n." "B," etc., the e-mail routine 50 would determine that the name "H. Jon Benjamin" corresponds to the input.

For many common characters, there will be a number of corresponding names within the address book. There are a number of methods of providing output when there are a plurality of corresponding names. For example, the first suggested name may appear as an "auto-complete" suggestion in the e-mail address book search field 76 and alternate suggestions may appear in a results list 72, or, only the first suggested name may appear as an "auto-complete" suggestion in the input field and no other alternatives are shown, or, the e-mail address book search field 76 may only display the user's input and all alternatives are shown in a results list 72, or, the e-mail address book search field 76 may only display the user's input and only the first suggested name may appear in a results list 72. While any method may be used with either the search field or the "To:" field 74, the first method is described below.

In the presently described example embodiment, when using the search function in a search field, it is known to present a suggested auto-completion within the search field and to provide other corresponding names in a list adjacent the search field. Typically, the corresponding names are provided in alphabetical order. Thus, the first corresponding name is presented per the auto-completion described above. That is, if the address book includes only the names "Bill Smith" and "Bill Turner," an input of the character "B" would cause the auto completion routine to present "ill Smith" as a suggested completion within the search field. It is noted that the portion of the name suggested by the auto-completion routine is typically highlighted 80. Further, the name "Bill Turner" would appear on a list adjacent, typically below, the search field 70. A user may select "enter," or other command input, to cause the suggested name to be entered into the e-mail message's "To:" field 74, select the alternate name, or continue inputting characters. It is noted that as the user provides additional character input, the number of suggested names typically decreases. That is, as more characters are input, the number of corresponding names decreases. In this example, with only two names in the address book, the user would have to complete the first name, "Bill" and input the character "T" before the suggested output would switch to "Bill Turner."

It is further noted that should the user provide an input that has no corresponding names in the address book, either in non-Latin or Latin characters, there would be no results. That is, the auto-complete would not provide a suggested completion and/or the results list 72 would be blank. This may occur after names are initially suggested. In this example having only a "Bill Smith" and a "Bill Turner" in the address book, if a user input the characters "B," "i," "l," "l" and "A", there would be no corresponding name and the result would be no suggested output. In this instance, the input provided by the user could be used and the name in the "To:" field 74 provided the input was in the proper form for an e-mail address, e.g. "BillAcker@XYZ.com"

In another alternate embodiment, when a user provides input within an e-mail message's "To:" field 74, only a single suggested output is provided within the e-mail message's "To:" field 74. That is, no list of other corresponding names are presented. Thus, if there are, for example, multiple "Bills" in the address book each with a different last name, the user will have to complete the first name and input at least an additional character of a last name before the intended "Bill" is suggested as the auto completion (unless the intended "Bill" is the first name suggested).

In yet another alternate embodiment, only the most commonly used name is suggested. Accordingly, if there are, for example, multiple "Bills" in the address book each with a different last name, the most commonly used "Bill" would be suggested as the auto completion. To select an alternate "Bill", the user will have to delete the most commonly used suggestion and complete the first name and input the first letter(s) of a last name before the alternate "Bill" is suggested as the auto completion. Further, the electronic device 4 may include a routine 44 that provides contextual suggestions. The context may be base on various factors such as, but not limited to, the time of day. For example, if the user regularly sent an e-mail message to Bill Smith in the morning and Bill Turner in the afternoon, the suggested output could be based on the time of day.

The e-mail routine 50 then utilizes the transliteration routine 44T to determine if there are any Latin character names that correspond to the character string. That is, the transliteration routine 44T is utilized to determine at Step 180 which Latin characters are associated with the character string. It is again noted that, after a single input, the character string is a single character, thus the transliteration routine 44T may determine which single Latin character is associated with the single character string.

The e-mail routine 50 then determines at Step 190 if any Latin character names within the address book correspond to the associated character string. This process is substantially similar to the process described above with respect to non-Latin characters.

If any non-Latin character names or Latin character names within the address book correspond to the associated character string, the e-mail routine 50 presents at Step 200 at least one name that corresponds to the detected character string. As noted above, the presentation of a single corresponding name occurs in the search field or the "To:" field 74 and other corresponding names are presented in a results list 72, however, as noted above, other output schemes may be used. It is noted that the list may be a complete list of corresponding names, but more typically is a partial list that presents a limited number of the corresponding names in alphabetical order.

The user may input additional characters by actuating additional character keys. Each time an additional character key is actuated, the method set forth above is reiterated 210. That is, the process of detecting 160 a non-Latin character string input, determining 170 if any non-Latin character names within the address book correspond to the detected character string, determining 180 which Latin characters are associated with the character string, determining 190 if any Latin character names within the address book correspond to the associated character string; and if any non-Latin character names or Latin character names within the address book correspond to the associated character string, presenting 200 at least one name that corresponds to the detected character string, is performed each time a user inputs an additional character. Each time the user inputs additional characters the character string becomes longer and, typically, the number of corresponding names is reduced. Thus, the user will, eventually, be presented with a single name.

As noted above, if the input provided by the user does not have any corresponding names, in either the non-Latin characters or the Latin characters, the routine, after step 190 may insert 195 the user's input into the "To:" field 74. Preferably, the e-mail routine is structured to confirm that the name is in proper e-mail format.

The following example demonstrates the method disclosed above and is described in reference with FIGS. 5A-5D. In this example, the user is Greek and utilizes the Greek character set on his handheld electronic device 4. The user has a friend from England named Danny and a Greek friend named Dana, as well as a number of other friends. Each friend has sent messages to the user and the user has added both Danny and Dana to his address book. The message from Danny was in English (a Latin language) and Danny is recorded as "Danny" in the address book. The message from Dana was in Greek (a non-Latin language) and Dana is recorded as "Δανα" in the address book. The user now wishes to write a message to Danny.

The user initiates at Step 150 the e-mail address book search field by opening a search in the address book wherein the cursor is located within the e-mail address book search field. The user then actuates the character key 25 having the character "Δ" thereon. That is, the user provides 154 input within the "To:" field 74 of the e-mail message. The e-mail routine 50 detects at Step 160 the non-Latin character string input and determines 170 if any non-Latin character names (or e-mail addresses) within the address book correspond to the detected character string. In this example, the e-mail routine 50 finds Δανα and Διμιτρυ (Dimitry, another Greek friend in the address book).

The e-mail routine 50 then utilizes the transliteration routine 44T to determine 180 which Latin characters are associated with the character string. In this instance, the Greek character "Δ" is associated with the Latin character "D." Thus, the transliteration routine 44T determines 180 that "Δ" is associated with the Latin character "D."

The e-mail routine 50 then determines at Step 190 if any Latin character names within the address book correspond to the associated character string. In this example, the only Latin character name in the address book starting with the letter "D" is Danny.

Thus, having determined that the address book includes three names that correspond to the input of "Δ," the e-mail routine 50, Δανα, Danny and Διμιτρυ, the e-mail routine 50 presents at Step 200 at least one name that corresponds to the detected character string. In this example, the user has utilized the e-mail routine's search function. As described above, the e-mail routine 50 is structured to present a list of all corresponding names with a suggested name appearing in the e-mail address book search field. Thus, as shown, all three names are presented with Δανα appearing in the e-mail address book search field 76 and Danny and Διμιτρυ appear on the list. It is noted that if the user had started typing in the "To:" field 74, typically the only option presented would be Δανα appearing in "To:" field 74.

At this point the user may select the name "Danny" by clicking, or double clicking, on the name Danny in the list. Alternately, the user may provide additional input. Thus, if the user were to actuate the character key 25 having the "α" character, the method would be reiterated, as described above. The result following the input of the "α" character would be that the name Διμιτρυ would no longer appear on the list as Διμιτρυ does not match the character string "Δα." "Danny," however, would still appear on the list below Δανα.

The user then inputs the additional characters "v" and "v." Each time the user provides input, the method is reiterated as described above. After the second "v" is input, the character string no longer corresponds to the name Δανα, and the only choice remaining is Danny. The user may then click, double click, or actuate the "enter" key to select Danny as the addressee. Upon the selection of an addressee, a new e-mail message is created with the selected name in the "To:" field 74, as is known in the art. It is noted that, if the user had selected a non-Latin name as the addressee, or as an additional addressee, the e-mail routine 50 would convert this name to Latin characters, as described above, prior to sending the e-mail message.

While specific embodiments of the disclosed and claimed concept have been described in detail, it will be appreciated by those skilled in the art that various modifications and alternatives to those details could be developed in light of the overall teachings of the disclosure. For example, the present application has used a full keyboard as an example; however, the method is equally effective with a reduced keyboard coupled with a disambiguation routine. Accordingly, the particular arrangements disclosed are meant to be illustrative only and not limiting as to the scope of the disclosed and claimed concept which is to be given the full breadth of the claims appended and any and all equivalents thereof.

What is claimed is:

1. A method of performing a multilingual search within an e-mail address book search field on a handheld electronic device, the handheld electronic device including a display, a keyboard, and a processor apparatus, the keyboard having a plurality of character keys, including a plurality of character keys associated with a non-Latin character set, the processor apparatus having a processor and a memory, the processor apparatus structured to receive input from the keyboard keys and to provide output signals to the display, the memory having a number of routines stored therein, at least one keyboard routine structured to associate a character key input with a specific character, the characters being provided in a database having sets of associated characters, the sets of associated characters including at least one non-Latin character set and the Latin character set, and at least one e-mail routine having an address book structured to store names in both at least one non-Latin character set and the Latin character set, said e-mail routine further structured to present an e-mail address book search field and to detect and present input from the keyboard character keys, the method of performing a multilingual search within an e-mail address book search field on a handheld electronic device compromising the steps of:
   a) detecting input of a first at least one non-Latin character;
   b) determining if a non-Latin character name within the address book corresponds to the detected input;
   c) determining a first at least one Latin character associated with each character of the input;
   d) determining if a Latin character name within the address book corresponds to the first at least one Latin character;
   e) if any non-Latin character names or Latin character names within the address book correspond to the first at least one Latin character, presenting at least one name that corresponds to the detected first at least one non-Latin character
   f) receiving a trigger input;
   g) detecting input of a second at least one non-Latin character;
   h) determining a second at least one Latin charter associated with the second at least one non-Latin character; and
   i) presenting at least a second Latin character name that corresponds to the first at least one Latin character and the second at least one Latin character.

2. The method of claim 1 wherein said at least one e-mail routine includes a search function and a selectable search option, said at least one e-mail routine structured to present a search field and a results list, further comprising the steps of:
   prior to step (a), selecting an e-mail address book search option;
   after step (e), selecting at least one name that is presented; and
   creating a new e-mail message being addressed to the selected name.

3. The method of claim 2 wherein the step of presenting at least one name that corresponds to the detected input includes the step of:
   presenting a plurality of corresponding name in a results list.

4. The method of claim 1 further comprising the steps of:
   prior to step (a), creating a new e-mail message, the message having at least one "To:" field;
   positioning a cursor within the new e-mail "To:" field; and
   after step (e), selecting the at least one name that is presented.

5. The method of claim 1 further comprising the steps of:
   reiterating steps (a)-(e) wherein the input becomes longer with each iteration.

6. The method of claim 1, wherein receiving a trigger input further comprises detecting actuation of a manual conversion, an input that is not subject to auto-completing, or detecting of a functional character input.

7. The method of claim 1, further comprising:
   after receiving the trigger input, removing display of any non-Latin character names that are currently displayed.

8. The method of claim 1, further wherein:
   a non-Latin character name within the address book corresponds to the detected input if the non-Latin character name contains the detected input; and
   a Latin character name within the address book corresponds to a Latin character if the Latin character name contains the Latin character.

9. A handheld electronic device, comprising:
   a housing;
   an input apparatus including a keyboard with a plurality of character keys;
   an output apparatus including a display;
   a processor apparatus having a processor and a memory, the processor apparatus is structured to receive input from the keyboard, to provide output signals to the display, and to execute a number of routines;
   the memory having a number of routines stored therein;
   the number of routines including at least one keyboard routine structured to associate an individual character key input with a specific character, the characters being provided in a database having sets of associated characters, the sets of associated characters including at least one non-Latin character set and the Latin character set;
   the number of routines including at least one e-mail routine structured to present an e-mail address field and to detect and present input from the keyboard character keys;
   wherein the processor apparatus is structured to execute the at least one keyboard routine and the at least one e-mail routine to cause the handheld electronic device to perform operations comprising:

a) having the plurality of character keys associated with a non-Latin character set;
b) detecting input of a first at least one non-Latin character;
c) determining if any non-Latin character names within the address book corresponds to the detected input;
d) determining a first at least one Latin character associated with each character of the input;
e) determining if any Latin character names within the address book corresponds to the first at least one Latin character;
f) if any non-Latin character names or Latin character names within the address book correspond to the first at least one Latin character, presenting at least one name that corresponds to the detected first at least one non-Latin character;
g) receiving a trigger input;
h) detecting input of a second at least one non-Latin character;
i) associated with the second at least one non-Latin character associated with the second at least one non-Latin character; and
j) presenting at least a second Latin character name corresponds to the first at least one Latin character and the second at least one Latin character.

10. The method of claim 9 wherein said at least one e-mail routine includes a search function and a selectable search option, said at least one e-mail routine structured to present a search field and a results list, further comprising the steps of:
prior to step (b), selecting an e-mail address book search option;
after step (f), selecting at least one name that is presented; and
creating a new e-mail message being addressed to the selected name.

11. The method of claim 10 wherein the step of presenting at least one name that corresponds to the detected input includes the step of:
presenting a plurality of corresponding name in a results list.

12. The method of claim 9 further comprising the steps of:
prior to step (b), creating a new e-mail message, the message having at least one "To:" field;
positioning a cursor within the new e-mail "To:" field; and
after step (f), selecting the at least one name that is presented.

13. The method of claim 9 further comprising the steps of:
reiterating steps (b)-(f) wherein the input becomes longer with each iteration.

14. The device of claim 9, wherein receiving a trigger input further comprises detecting actuation of a manual conversion, an input that is not subject to auto-completing, or detecting of a functional character input.

15. The device of claim 9, wherein the processor is further structured to cause the handheld electronic device to perform operations comprising:
after receiving the trigger input, removing display of any non-Latin character names that are currently displayed.

16. The device of claim 9, further wherein:
a non-Latin character name within the address book corresponds to the detected input if the non-Latin character name contains the detected input; and
a Latin character name within the address book corresponds to a Latin character if the Latin character name contains the Latin character.

* * * * *